US010025950B1

(12) United States Patent
Avasarala et al.

(10) Patent No.: US 10,025,950 B1
(45) Date of Patent: Jul. 17, 2018

(54) SYSTEMS AND METHODS FOR IMAGE RECOGNITION

(71) Applicant: Everalbum, Inc., San Francisco, CA (US)

(72) Inventors: Bhargav Avasarala, San Francisco, CA (US); Douglas Frederick Aley, Greenbrae, CA (US); Johnny Nienwei Chen, San Francisco, CA (US); Andrew Dudum, San Francisco, CA (US); Colin James Eles, Waterloo (CA); Jonathan Ryan Mumm, San Francisco, CA (US)

(73) Assignee: Everalbum, Inc, San Francisco, CA (US)

( * ) Notice: Subject to any disclaimer, the term of this patent is extended or adjusted under 35 U.S.C. 154(b) by 0 days.

(21) Appl. No.: 15/712,040

(22) Filed: Sep. 21, 2017

Related U.S. Application Data (60) Provisional application No. 62/559,616, filed on Sep. 17, 2017.

(51) Int. Cl.
*G06K 9/62* (2006.01)
*G06F 21/62* (2013.01)
*G06K 9/00* (2006.01)

(52) U.S. Cl.
CPC ..... *G06F 21/6218* (2013.01); *G06K 9/00281* (2013.01)

(58) Field of Classification Search
CPC ........... G06F 17/30705; G06F 17/3071; G06F 17/30713; G06F 19/707; G06K 9/00624; G06K 9/6223; G06K 9/6226; G06K 9/627

USPC ........................................................ 382/225
See application file for complete search history.

(56) References Cited

U.S. PATENT DOCUMENTS

| | | | | |
|---|---|---|---|---|
| 5,835,901 A | * | 11/1998 | Duvoisin, III | G06K 9/627 706/16 |
| 5,850,470 A | * | 12/1998 | Kung | G06K 9/00241 382/157 |
| 5,963,670 A | * | 10/1999 | Lipson | G06F 17/3025 382/224 |
| 6,331,116 B1 | * | 12/2001 | Kaufman | G06K 9/209 345/418 |
| 6,331,859 B1 | * | 12/2001 | Crinon | G06F 17/30799 345/619 |
| 7,016,540 B1 | * | 3/2006 | Gong | G06F 17/30802 348/700 |

(Continued)

OTHER PUBLICATIONS

"Face Detection Concepts Overview", Google Developers, Retrieved from: https://developers.google.com/vision/face-detection-concepts, Last updated Oct. 14, 2016, 4 pgs.

(Continued)

*Primary Examiner* — Iman K Kholdebarin
(74) *Attorney, Agent, or Firm* — KPPB LLP (57) ABSTRACT

Systems and methods that utilize an image processing model to analyze features of an image to identify individuals within a set of images are disclosed. Feature vectors for the images are extracted and clustered based on a distance between the feature vectors in a feature space. The clusters are used to identify individuals within the images with the aid of human annotators. The identified individuals and images can be used to retrain the image processing model.

17 Claims, 9 Drawing Sheets

(56) References Cited

U.S. PATENT DOCUMENTS

| | | | | |
|---|---|---|---|---|
| 7,697,765 | B2* | 4/2010 | Matsugu | G06K 9/4619 382/159 |
| 8,068,687 | B2* | 11/2011 | Nishiyama | G06K 9/00228 348/169 |
| 8,224,042 | B2* | 7/2012 | Wang | G06K 9/00275 382/118 |
| 8,542,887 | B2* | 9/2013 | Nakano | G06K 9/00288 382/118 |
| 8,605,956 | B2* | 12/2013 | Ross | G06K 9/622 340/5.53 |
| 9,076,078 | B2* | 7/2015 | Miyashita | G06K 9/6256 |
| 9,589,181 | B2* | 3/2017 | Ito | G06K 9/00288 |
| 2009/0092313 | A1* | 4/2009 | Negi | G06K 9/6256 382/160 |
| 2009/0285473 | A1* | 11/2009 | Li | G06K 9/4619 382/159 |

OTHER PUBLICATIONS

Qi et al., "Contrastive-center loss for deep neural networks", arXiv:1707.07391v1, Jul. 24, 2017, 5 pgs.

Qi et al., "Contrastive-center loss for deep neural networks", arXiv:1707.07391v2, Aug. 23, 2017, 5 pgs.

Schroff et al., "FaceNet: A Unified Embedding for Face Recognition and Clustering", Proc. CVPR, 2015, 9 pgs.

Szegedy et al., "Inception-v4, Inception-ResNet and the Impact of Residual Connections on Learning", arXiv:1602.07261v1, Feb. 23, 2016, 12 pgs.

Szegedy et al., "Inception-v4, Inception-ResNet and the Impact of Residual Connections on Learning", arXiv:1602.07261v2, Aug. 23, 2016, 12 pgs.

Venkatesh et al., "Fast Bounding Box Estimation based Face Detection", ECCV Workshop on Face Detection, 2010, 14 pgs.

Viola et al., "Rapid Object Detection using a Boosted Cascade of Simple Features", IEEE Computer Vision and Pattern Recognition, 2001, 9 pgs.

Wang et al., "Face R-CNN", arXiv:1706.01061v1, Jun. 4, 2017, 10 pgs.

Wen et al., "A Discriminative Feature Learning Approach for Deep Face Recognition", ECCV, Springer, 2016, 17 pgs.

* cited by examiner

SYSTEMS AND METHODS FOR IMAGE RECOGNITION

CROSS REFERENCED APPLICATION

This application claims priority to U.S. Provisional Application Ser. No. 62/559,616, entitled "Systems and Methods for Image Recognition", filed Sep. 17, 2017. The contents of this application are hereby incorporated by reference in its entirety.

FIELD OF THE INVENTION

The present invention generally relates to facial recognition and, more specifically, to training classification models for image recognition.

BACKGROUND

With the explosion in the number of images captured each and every day, the ability to recognize and identify elements, such as faces, from images has become an increasingly sought after feature in image organization and processing. However, the ability to reliably gather labeled data for real world images has proven difficult.

SUMMARY OF THE INVENTION

Systems and methods for recognizing individuals in images based on feature clusters in accordance with embodiments of the invention are illustrated. One embodiment includes a method for generating a labeled dataset using a model trained with an initial dataset. The method extracts a set of feature vectors from a corresponding set of images based on the trained model, clusters the set of feature vectors to identify a set of clusters, presents images of an initial cluster of the set of clusters, receives an identity of an individual to be associated with the presented images, presents images from each cluster of a set of neighboring clusters identified from the set of clusters, and, based on input received from a user, associates the identity to images of the set of neighboring clusters.

In another embodiment, the method further comprises retraining the model using the associated identity and the images of the initial cluster and the set of neighboring clusters.

In a further embodiment, the method further comprises extracting a second set of feature vectors from a second set of images based on the retrained model, and associating the identity to a subset of the second set of images based on the second set of feature vectors.

In still another embodiment, the trained model is a convolutional neural net (CNN).

In a still further embodiment, each feature vector of the set of feature vectors is a 128 dimensional feature vector.

In yet another embodiment, clustering the set of feature vectors comprises setting a clustering threshold for identifying feature vectors in each cluster of the set of clusters.

In a yet further embodiment, the clustering threshold is an adaptive clustering threshold that is based on at least one of a number of images that are being processed for a particular user, a distribution of the feature vectors within a feature space, and relationships between different individuals identified in the set of images.

In another additional embodiment, presenting images of the initial cluster comprises displaying an image for each feature vector in the initial cluster.

In a further additional embodiment, the initial cluster is selected based on at least one of a size of the cluster and a compactness of the cluster.

In another embodiment again, each neighboring cluster comprises a plurality of images, wherein presenting images from each neighboring cluster of the set of neighboring clusters comprises displaying a single image from each neighboring cluster.

In a further embodiment again, the single image from each neighboring cluster is one of a nearest image within each neighboring cluster to the initial cluster, a farthest image within each neighboring cluster to the initial cluster, and a central image within the neighboring cluster.

In still yet another embodiment, presenting images from each neighboring cluster further comprises suggesting the received identity as an identity to be associated with the set of neighboring clusters.

In a still yet further embodiment, the input received from the user comprises a selection of a subset of the set of neighboring clusters that include images of the identified individual.

In still another additional embodiment, the method further comprises storing the associated identities for each image in the set of images in a database.

In a still further additional embodiment, the method further comprises using the set of images and the associated identities as a training dataset for a facial recognition model.

In still another embodiment again, the database stores image sets with associated identities from images received from a plurality of different devices associated with the user.

In a still further embodiment again, the database stores image sets with associated identities from images of a plurality of different users.

Another additional embodiment includes a system for generating a labeled dataset using a model trained with an initial dataset that includes one or more processors, a memory readable by the one or more processors and instructions stored in the memory. The instructions, when read by the one or more processors, direct the one more processors to extract a set of feature vectors from a corresponding set of images based on the trained model, cluster the set of feature vectors to identify a set of clusters, present images of an initial cluster of the set of clusters, receive an identity of an individual to be associated with the presented images, present images from each cluster of a set of neighboring clusters identified from the set of clusters, and based on input received from a user, associate the identity to images of the set of neighboring clusters.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures, which are presented as exemplary embodiments of the invention and should not be construed as a complete recitation of the scope of the invention.

DETAILED DESCRIPTION

Turning now to the drawings, systems and methods for recognizing individuals in images based on clusters of images and their features are illustrated. Systems and methods in accordance with many embodiments of the invention include an image processing system that utilizes an image processing model to analyze features of an image to identify individuals within the image. The image processing model in accordance with a number of embodiments of the invention includes a convolutional neural network (CNN) that is trained to identify important features of images based on an initial training set of images and labels.

In many embodiments, the image processing model performs a feature extraction process that generates feature vectors for a set of images (e.g., a set of faces). The feature extraction process can utilize the CNN, trained through supervised machine learning processes, to learn to identify distinguishing features of faces based on the analysis and classification of the initial training set of images that include faces of a number of pre-identified individuals. The performance of the feature extraction is often dependent upon the extent to which the training data used for training the CNN is statistically representative of the population.

The precision and accuracy of such CNNs depends heavily on the accuracy and diversity of the training set used to train a CNN. Training datasets are typically built by having human annotators annotate, or label, images. However, having human annotators annotate each individual image is both time consuming and expensive. In addition, it is difficult to obtain training datasets that include a large number of accurately labeled ground truth images. It is particularly difficult to obtain training datasets that include ground truth images that contain imperfect representations of an object or person (e.g. images that are partially occluded, out of focus, low lighting conditions, and/or captured from different viewpoints).

In several embodiments, the image processing system takes advantage of a user's library of images to tune and personalize the image processing model to better distinguish between the individuals found within the user's library of images and/or across multiple user's libraries of images.

The image processing system uses the clustering process to simplify and streamline the annotation process, while significantly increasing the accuracy and completeness of the annotation of the user's images. Annotation for a group of images can be accelerated by using machine learning to identify similar images and requesting a human annotator to confirm that the images are all of the same entity or object and/or to provide a label annotating all of the images. Using clustering to identify an initial set of images that are likely to be of the same person of object can be particularly effective for annotating the images when soliciting annotations from informal annotators (e.g. users of a software application). When the annotation task is simple, for example confirming that all images are of the same person or object and/or requesting that you provide a label for images of the person or object, then an informal annotator is much more likely to engage in the action of accurately annotating the images.

The clustering process can further be used to identify neighboring clusters with images that are similar to a cluster that has already been annotated. In many embodiments, user interfaces are generated in which at least one image representative of each similar cluster is displayed and a user is asked to confirm that the images are images of the previously annotated object or person. In this way, the human annotator can efficiently annotate images that provide a much larger and more statistically representative sample of possible images of a person or object.

The clustering process in accordance with many embodiments of the invention is tuned to allow for the efficient and accurate labeling of identities in images. If the criterion for clustering is too narrow, then the images that are presented to the human annotator may not include much variety and may not be representative of all the possible images that might include an image of an individual or object. However, if the criterion for clustering is too broad, then the images that are presented to the human annotator may include a higher number of false positives such that each cluster lacks homogeneity. In such a case, labeling a cluster based on a representative image may result in the mislabeling of other images within a cluster. Many embodiments of the invention tune the clustering process to use narrower clustering criterion in order to increase the likelihood that the images within each cluster are homogenous (i.e., increased precision) so that a representative image can be used to label the entire cluster with a high degree of accuracy.

These annotated ground truth images can then be utilized to supplement or expand the training set in order to retrain image recognition classifiers based on the annotated images. The retrained classifiers can achieve improved performance due to greater access to more diverse training images of each person or object. By training on a user's personal library of images, the retrained classifiers can be trained to identify features that are particularly useful in distinguishing between individuals of the user's images. As such, the classifiers are able to learn features that more distinctly identify individual people or objects than can be learned from the initial training dataset.

Image Processing Systems

Systems in accordance with a number of embodiments of the invention provide a multi-step interface for identifying individuals in a clustered set of images based on representative images from each cluster. Image processing systems in accordance with a number of embodiments of the invention provide one or more devices for gathering images, extracting features from the gathered images, clustering the images based on the extracted features, and labeling the images based on the clustered images.

Figure 1:
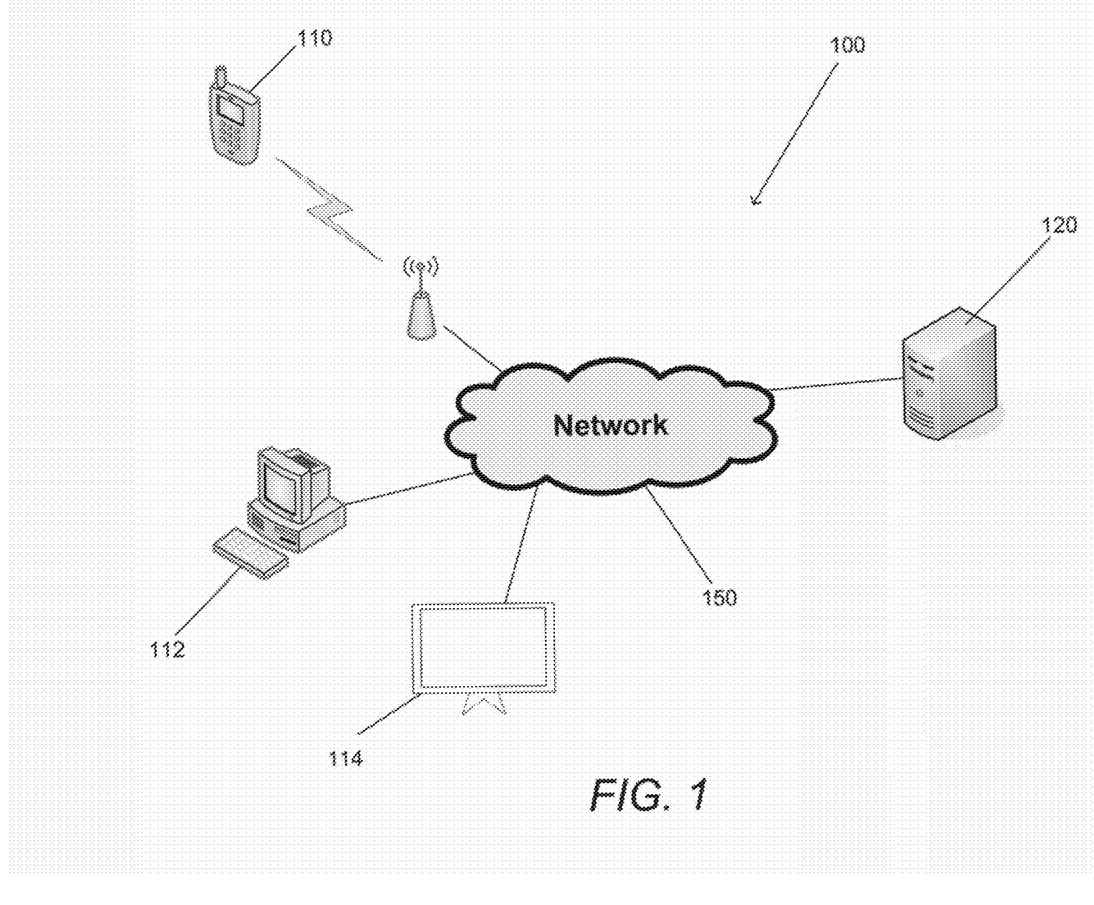
FIG. 1 is a system diagram illustrating components of an image processing system in accordance with an embodiment of the invention.

A system diagram of an image processing system in accordance with an embodiment of the invention is illustrated in FIG. 1. Image processing system 100 includes various client devices 110-114, network 150, and image processing elements 120.

Client devices 110-114 in this example include a mobile phone 110, a desktop computer 112, and a smart TV 114. Client devices may refer to any of a number of devices associated with a user including mobile devices, laptop computers, desktop computers, storage devices, smart appliances, and/or any other device as appropriate to the requirements of a given application. In some embodiments, the client devices provide an image processing application that provides an interface for identifying an identity for individuals, or entities, found within the images. Image processing applications in accordance with several embodiments of the invention collect the data regarding the identified entities to train and retrain feature vector clustering engines and/or image classifiers to achieve greater recall and precision. An image processing application in accordance with a number of embodiments works in conjunction with imaging applications that provide various image related services including, but not limited to, image capture, entity identification, photo organization, and social networking services. As can readily be appreciated, image processing applications can be provided in any of a variety of contexts as appropriate to the requirements of specific image recognition systems in accordance with various embodiments of the invention.

Image processing elements 120 of this example includes a server cluster composed of one or more servers that are used for the backend applications of the image processing system. Image processing elements in accordance with many embodiments of the invention can be implemented on a personal computer, a server computer system, a cloud service, or any other computing device as appropriate to the requirements of a given application. Image processing elements in accordance with many embodiments of the invention are used to collect images, process images to cluster images associated with a user, and to locate and identify entities visible within images. Many of the examples described below are described with reference to the identification and recognition of faces from images, but one skilled in the art will recognize that the systems and processes described herein could be applied to recognize various different types of elements including, but not limited to, animal species, plant species, vehicle types, and building styles. In several embodiments, image processing elements can provide a cluster based interface for clustering images of an entity to facilitate solicitation of annotations from human annotators. The annotated images can then be utilized in the training of classification engines.

In many embodiments, image processing elements gather images from one or more client devices, including (but not limited to) from a user's cloud services, images captured by a camera of the client device, local storage of the client device, and/or network storages for processing. The image processing elements can operate to perform processing for entity recognition and clustering, and communicate with a client device to collect annotations for the clusters of images based on input received from human annotators. Client devices in accordance with certain embodiments of the invention can pass the annotations to computing elements (such as a cloud service), which enables the image processing elements to retrain the image classifier, and, in many embodiments, provide the client device with an updated image classifier. In some embodiments, the image processing elements can aggregate annotated images from multiple client devices and use the entire dataset to train an image classifier that can then be distributed to one or more of the client devices.

In some embodiments, the entire image processing system is implemented on a single device. For example, in a number of embodiments, a single client device performs the image processing for entity recognition and clustering, and also provides an interface for receiving inputs from human annotators that enable labeling of the entities and related neighboring clusters. In some embodiments, the labeled images can be used to train a classifier for labeling new images that are gathered by the image processing system. The labeled images of the clusters can be used as an expanded training dataset to re-train or tune the image processing system (e.g., an entity recognition process, a clustering process, and/or a classifier).

The client devices connect with image processing elements 120 through network 150. The network can be, but is not limited to, the Internet, a local area network, a wireless local area network, wide area network, a software defined network, and/or any other type or combination of types of network as appropriate to the requirements of a given application.

Figure 2:
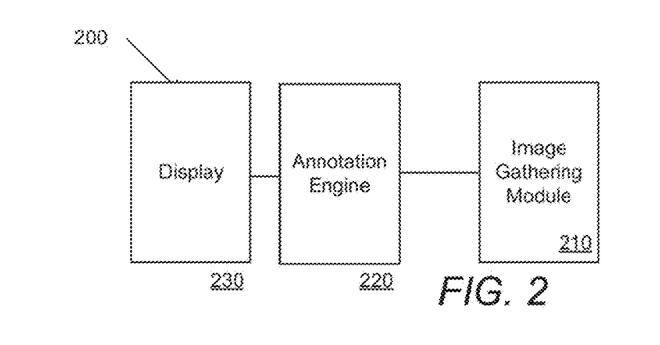
FIG. 2 is a block diagram that conceptually illustrates a client device that can be utilized to label and identify entities in images in accordance with an embodiment of the invention.

A client device that can be utilized to label and identify entities in images in accordance with an embodiment of the invention is illustrated in FIG. 2. Client device 200 includes an image gathering module 210, annotation engine 220, and display 230. Image gathering module 210 is utilized to acquire image data that can be processed by an image processing system. Image gathering modules can include (but are not limited to) cameras, photo organizing software, and photo download services. In certain embodiments, image gathering modules gather portions of images in which a feature (such as a face) has been detected. Image gathering modules in accordance with a number of embodiments of the invention send the gathered images (and/or portions of images) to an image processing element to identify potential entities within the images. In some embodiments, the image gathering modules do not directly gather the images, but provide access to images stored remotely (e.g., in a cloud service) to image processing elements. In many embodiments, the image gathering module provides images that are specifically associated with the user to the image processing element in order to tune, or personalize, the image recognition system based on the gathered images.

Client devices in accordance with a number of embodiments of the invention transmit the gathered images to image processing elements which process the images to recognize entities within the images and to cluster the images based on features within the images. In some embodiments, the client devices receive the clustered images to present a user interface that allows the client device to receive, from a human annotator, annotations that identify the entities within the images. An example of such a user interface is described below with reference to FIG. 7.

Figure 3:
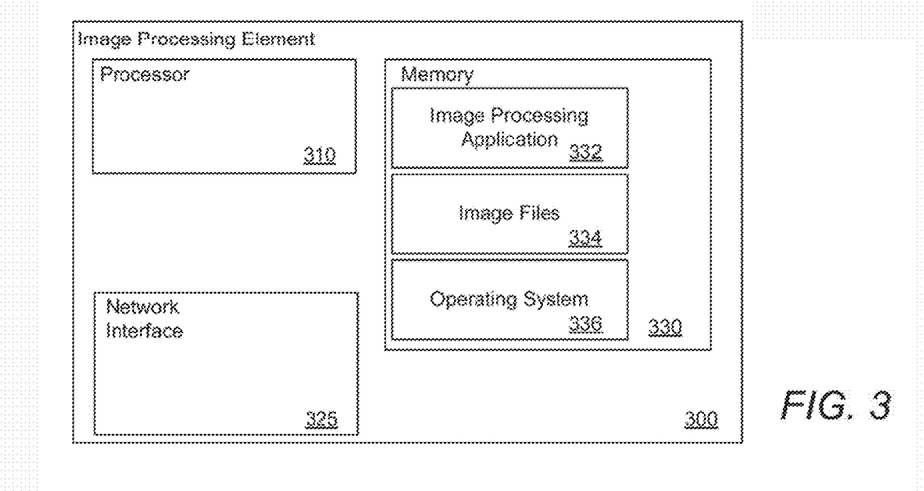
FIG. 3 is a block diagram that conceptually illustrates image processing system that can be utilized to automatically process captured images to generate cropped image metadata in accordance with an embodiment of the invention.

An image processing element that can be utilized to automatically process captured images to generate cropped image metadata in accordance with an embodiment of the invention is illustrated in FIG. 3. Image processing element 300 includes processor 310, network interface 325 and memory 330. Memory 330 contains image processing application 332, image files 334, and operating system 336. In many embodiments, image processing application 332 configures processor 310 to receive user images using network interface 325. Image processing application 332 can also configure processor 310 to analyze one or more of image files 334 to extract feature vectors from the images and cluster the images based on a distance between the feature vectors. Image processing application 332 configures processor 310 to send the clusters of images (or data identifying the images that make up each cluster) to a client device and to receive annotations for the images using network interface 325.

Although specific architectures for the image processing system, client devices, and image processing elements are described above with reference to FIGS. 1-3, any of a variety of client devices and image processing elements appropriate to the requirements of specific applications can be configured by image processing applications to cluster and annotate images in accordance with embodiments of the invention. The manner in which client devices and image processing elements communicate to distribute image files, cluster data, and/or annotation data in accordance with embodiments of the invention is discussed further below.

Image Clustering and Recognition

Image processing systems are used in a variety of different fields to recognize and identify elements in images. Many embodiments of the invention implement an image recognition workflow that uses an annotation of a first cluster to identify multiple proximate (or neighboring) clusters of images and solicits annotations based upon one or more images from each proximate, or neighboring, cluster. The annotations of the images of the proximate clusters can be used to expand the training set of images with the annotated images of the labeled entity prior to retraining the image classifier using supervised learning based upon the annotated dataset.

Figure 4:
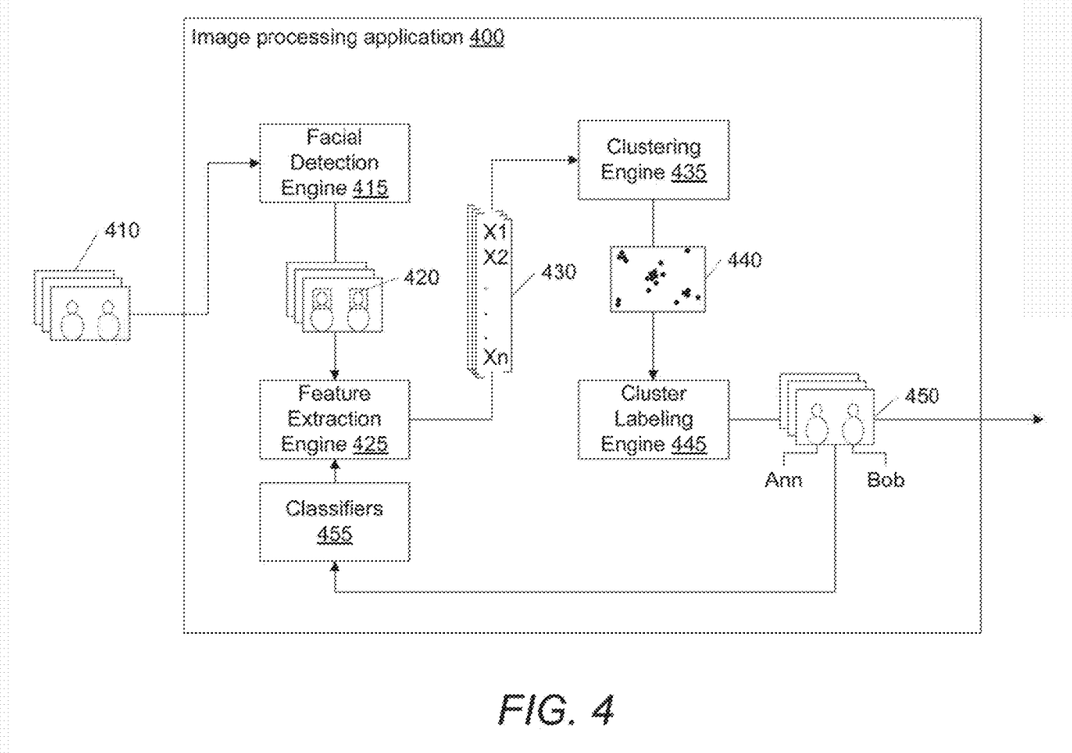
FIG. 4 illustrates an example of a recognition workflow in accordance with an embodiment of the invention.

A recognition workflow in accordance with an embodiment of the invention is illustrated in FIG. 4. The recognition workflow can be implemented by an image processing application 400 that gathers images, generates feature vectors with respect to the images using a previously trained classifier, clusters the feature vectors, solicits a human annotator to provide labels for images based on the clusters, and further refines the classifier based on the labeled images. By obtaining more annotated images with which to train the classifier, supervised learning processes can train a new classifier to learn new features that are better able to identify images of a specific entity and differentiate between images of different entities. The image processing application 400 collects images 410 for one or more users, which can be provided to a facial detection engine 415.

Facial detection engines in accordance with a number of embodiments are trained to analyze the input images to identify portions of the images that contain identifying features, such as faces. In some embodiments, a facial detection engine uses an object detection process, such as (but not limited to) a sliding window approach, to identify an associated region 420 (or bounding box) for each face within an image.

The associated regions 420 can then be provided to a feature extraction engine 425, which can be used to identify a feature vector 430 for each face. Feature extraction engines in accordance with a number of embodiments can be built using convolutional neural networks (CNNs), such as (but not limited to) Google's Inception ResNet. In some embodiments, the convolutional neural networks are deep networks with many layers that are trained using supervised learning processes, based on sets of labeled ground truth data, to automatically discover representations needed for feature detection, which can be used to distinguish between the faces of different people and identify different images of the face of the same person. Such training allows for the initial layers of the CNN to identify low level features (such as (but not limited to) edges, curves, ridges, and corners) that feed into the upper layers of the CNN, which can identify higher level features, such as (but not limited to) facial features, shapes, and proportions.

The CNN learns the features that are important for distinguishing between different faces by generating feature vectors based on an initial training dataset, classifying the images based on the feature vectors, and adjusting the way that the feature vectors are created (i.e., learning), based on labeled training data. The CNNs in accordance with many embodiments of the invention perform feature identification in a number of convoluted layers of the CNN, which then feed into a number of fully connected layers of the CNN that are used for classification and identification. In a number of embodiments, a feature extraction engine operates as a kind of black box, capturing the output (i.e., feature vectors) of a layer prior to the classification layers in the trained CNN. In this way, the training process learns the features that are best suited to discriminating between different entities. As is discussed further below, feature vectors learned through the training of the CNN can be utilized in unsupervised learning processes to identify clusters of similar images.

The clustering engine 435 can then cluster images based upon feature vectors 430 produced using the trained classifier to identify at least one cluster 440. In many embodiments, clustering engines identify clusters that satisfy a clustering criterion that indicates whether images should be grouped in a same cluster. For example, a clustering criterion may be used to determine that a set of images includes two clusters of images based on a distance between the feature vectors of the images in a feature space and/or the number of images within each cluster. A clustering engine 430 can then determine that the two clusters are likely to correspond to different entities based on a distance between the clusters. A set of images from each cluster can be presented to a human annotator, who can confirm that all images in the set for each cluster are of the same entity and then provide a label (and/or additional descriptive information) as an identity for the individual. For example, the human annotator can confirm that the two clusters show images of Ann and Bob respectively. Clustering engines can also provide representative images from neighboring clusters for an identified cluster to identify nearby clusters that include images of the same individual.

Clusters in accordance with many embodiments of the invention represent images that are "close" to each other within the feature space. In some embodiments, the closeness of images is measured as an L2 distance between a location of each feature vector in a feature space. As can readily be appreciated, any of a variety of distance metrics can be utilized to determine the distance between two highly dimensional feature vectors in feature space as appropriate to the requirements of a specific application in accordance with various embodiments of the invention.

Clustering processes in accordance with a number of embodiments of the invention can use hierarchical agglomerative clustering methods. In some embodiments, the clustering process uses unsupervised learning to train the clustering process. In many embodiments, clustering is performed using a variety of clustering processes including (but not limited to) DBScan, mean shift clustering, label propagation, and/or other methods of clustering as appropriate to the requirements of a given application.

In certain embodiments, the cluster labeling engine 445 labels the images associated with the feature vectors in the identified clusters to identify (e.g., with a name or other identifier) the identity of the specific individual associated with the various clusters of feature vectors. In this example, cluster labeling engine 445 has identified Ann and Bob in the labeled images 450. Cluster labeling engines in accordance with many embodiments of the invention use a multi-stage labeling process that (1) identifies an identity for an initial cluster of images and (2) gathers additional labeling data for neighboring clusters that are believed to also be images of the entity labeled in the initial cluster based upon a proximity criterion. In many embodiments, the identity and the additional labeling data are received based on inputs from a human annotator who provides a label identifying an entity in the initial cluster of images. Examples of methods for labeling the feature vectors and/or images based on neighboring clusters in accordance with several embodiments of the invention are described in further detail below.

In addition to identifying the identity of each entity in an image, cluster labeling engines in accordance with several embodiments of the invention use the labeled images as a part of an expanded training dataset to re-train or tune the weights of a feature extraction engine to allow for tighter and more compact clusters that match a single individual and to create greater distances between clusters of images of different individuals. Stated another way, a larger set of annotated data including a larger and more varied set of images for each individual image enables the supervised learning processes to retrain the CNNs utilized within the feature extraction engine to identify features that more reliably discriminate between images of different entities. In certain embodiments, retraining of a feature extraction engine allows the CNN to converge quickly to facial representations of the input faces that can yield improved recognition performance. In some embodiments, the labeled feature vectors (or images) are used to train classifiers 455 that can be used to propagate labels to new images as they are gathered without any need for further interactions from the user. In some embodiments, the classifiers operate on feature vectors generated by the same feature extraction engine used to label the initial set of images. As can readily be appreciated, any of a variety of unsupervised approaches can be utilized to generate additional annotated training data as appropriate to the requirements of a given application in accordance with various embodiments of the invention.

Although specific recognition workflows and image processing applications are described above with reference to FIG. 4, any of a variety of workflows, including (but not limited to) workflows in which annotation and retraining of feature extraction engines is performed in a distributed manner, can be utilized as appropriate to the requirements of specific applications in accordance with various embodiments of the invention. Processes for identifying multiple clusters of images of an entity and using annotations of the multiple clusters to retrain feature vector engines in accordance with a number of embodiments of the invention are discussed further below.

Image Recognition Processes

A number of object detection techniques exist that enable the detection of objects within images. Many embodiments of the invention can use a clustering process that identifies an initial cluster to gather an initial human annotation for the images of the initial cluster. The clustering process can use a proximity criterion to identify at least one neighboring cluster and present at least one image from each neighboring cluster to confirm the identity to be associated with the images of the neighboring cluster. In some embodiments, the labeled images can then be used to retrain a classifier and to classify other images with increased accuracy. Several examples are discussed below with respect to recognition of faces, but similar processes can be utilized to train CNNs to recognize any of a variety of entities.

Figure 5:
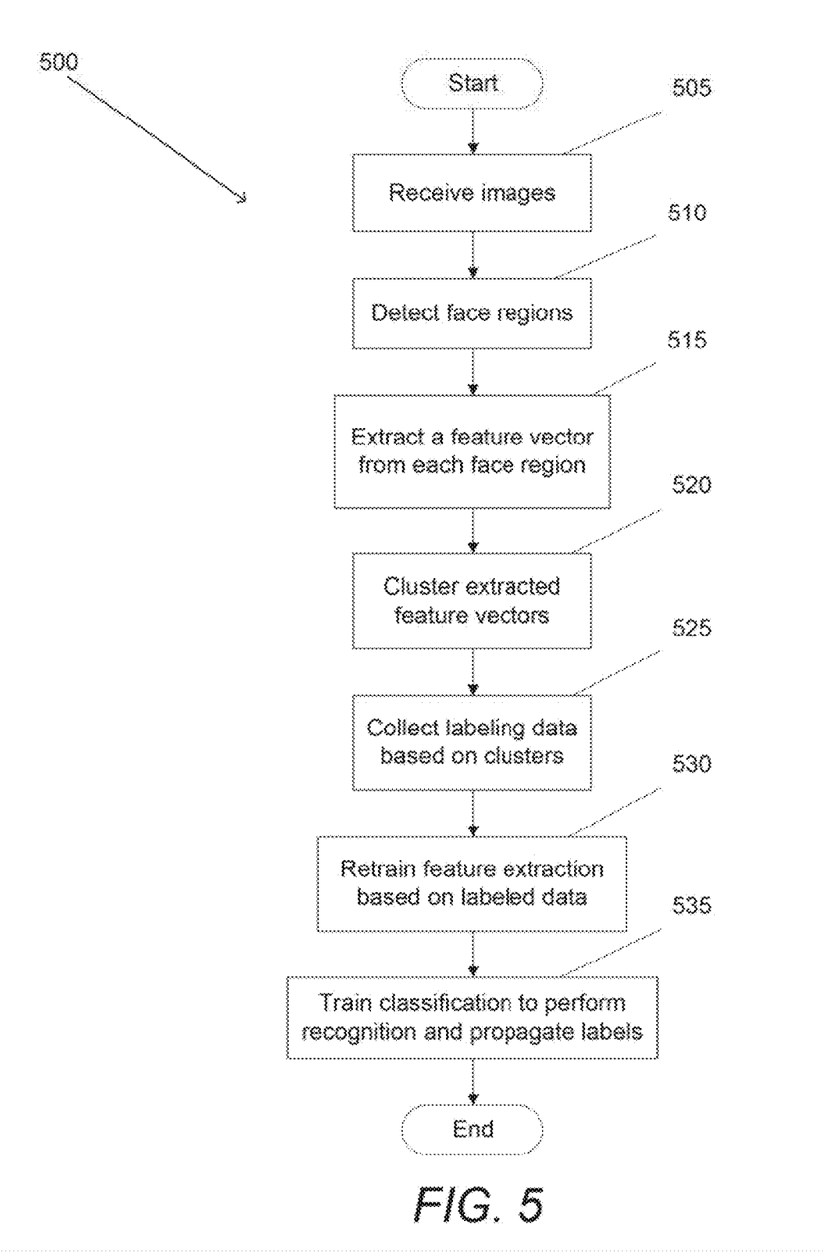
FIG. 5 is a flow chart illustrating a method for recognizing elements in images.

A method for recognizing elements in images in accordance with an embodiment of the invention is illustrated in FIG. 5. The process 500 receives (505) images. The images in accordance with several embodiments can be received from a user from a variety of different sources including (but not limited to) a set of client devices, cloud services, social networks, network storages, and/or devices associated with friends and/or family.

The process detects (510) face regions (e.g., bounding boxes) of the image which are identified as containing a face. The face detection can be performed using various methods of object detection, including, but not limited to, the Viola Jones detector as described in P. A. Viola, M. J. Jones, "Rapid object detection using a boosted cascade of simple features", *CVPR*, issue 1, 2001.

The process performs (515) feature extraction on the identified face regions to generate feature vectors for each identified face region. The feature vectors in accordance with certain embodiments are multi-dimensional feature vectors (for example, a 128 dimensional feature vector with a norm of 1) generated by a deep CNN that is trained to distinguish between a large set of faces. The CNN in accordance with some such embodiments generates a feature vector for each face region that represent the presence of high level features within the face region. In some embodiments, the feature extraction can also extract other embeddings for each of the face images. The embeddings in accordance with many embodiments can include various metadata describing the face including (but not limited to) age, ethnicity, pose, and/or sentiment of the face.

The process uses the feature vectors to perform (520) feature clustering. Feature clustering processes can be used to identify a number of clusters of feature vectors, where each cluster represents images of a single unique individual or single type of entity. It is also likely that multiple clusters will represent a single person due to factors including (but not limited to) partial occlusion of the person, focus, and/or the age of the person in each image. In several embodiments, the feature clustering is over-tuned to favor precision over recall, or to increase the likelihood that each cluster includes images of one and only one individual (i.e. homogenous), even if it results in several clusters that include the individual.

The process uses the images associated with the clusters to collect (525) labeling data, or annotations. For example, in the case of facial recognition, the process in accordance with certain embodiments of the invention provides an interface for labeling images based on the various clusters and their nearest neighbors. An example of such an interface is described in further detail below with reference to FIG. 7. In many embodiments, a combination of processes can be utilized including (but not limited to) combining manual annotations of images in specific clusters with the use of a threshold criterion in which a certain number of annotated images within a particular cluster is utilized to automatically propagate the annotation to all images within the cluster without requiring human annotation.

In certain embodiments, in addition to labeling data, the process collects (525) supplemental data that can also be used in training and retraining feature extraction engines. The supplemental data in accordance with a number of embodiments of the invention can include (but is not limited to) contact information, geographic information, image capture date/time, relationship data, and/or birthdays. The supplemental information may be gathered in various ways, including (but not limited to) directly from the user, from tag and/or metadata from the images, and from social networks (e.g. by associating a user identifier with the entity visible in the images and retrieving information about the entity via a social media service API using the user identifier). In certain embodiments, the supplemental data can be used to supplement the training of a classifier that is trained on the labeled data using a supervised learning process. The classifier can then be used to classify and label new images that are received. In several embodiments, the age, relationship, and/or date/time information can be used to tune a model to better distinguish between images of relatives and images of a same individual at different ages.

Age information can, in particular, be very helpful in identifying related clusters of images. In a number of embodiments, annotations include both identity and age. In this way, a CNN can be trained to learn how features of an individual change with age, enabling the CNN to develop feature vectors that enable clustering of images of an individual taken at different ages. Furthermore, supervised learning techniques can be utilized to determine distance metrics between feature vectors indicative of variations in age. In this way, a threshold criterion can be applied to clusters during an annotation process that presents images to a human annotator asking the annotator to confirm the identify of the person shown in the image and/or to confirm an age and/or provide age information. In certain embodiments, the recognition process not only identifies images of an individual but is able to suggest the age of the individual in each image based upon the proximity of the feature vector to a cluster of images of the individual at a particular age. As can readily be appreciated, the specific annotations that are utilized in clustering and recognition processes are largely dependent upon the requirements of a specific application.

In some embodiments, the labeled data can be used to retrain (530) the CNN used for feature extraction, in order to allow the CNN to identify tighter clusters with greater assurance that each cluster identifies one, and only one, person. Alternatively, or conjunctively, in some embodiments, the labeled data is used to train (535) a supervised classification engine to perform recognition and to label additional faces based on the supervised classification engine. The additional labeling in accordance with some embodiments is performed using a supervised learning model that incorporates the acquired label data for images to identify new images that include the identified persons. Due to the improved feature vectors, some embodiments of the invention allow for the use of a simplified supervised classification engine (e.g., a classification process with lesser processing and/or memory requirements) to identify individuals in new images that are gathered by the system. With lower inter-class distances (i.e., tighter clusters) and greater intra-class distances (i.e., greater separation between clusters), a supervised classification engine can use nearest neighbor methods and/or linear models to classify the images with good results. In certain embodiments, the labeled images are used to train a new neural network for classifying the images with labels.

Although a specific process for recognizing entities in images and labeling workflows and image processing applications is described above with reference to FIG. 5, any of a variety of processes including (but not limited to) processes in which entities are identified based on features other than face regions can be utilized as appropriate to the requirements of specific applications in accordance with various embodiments of the invention.

Image Labeling Based on Neighboring Clusters

Figure 6:
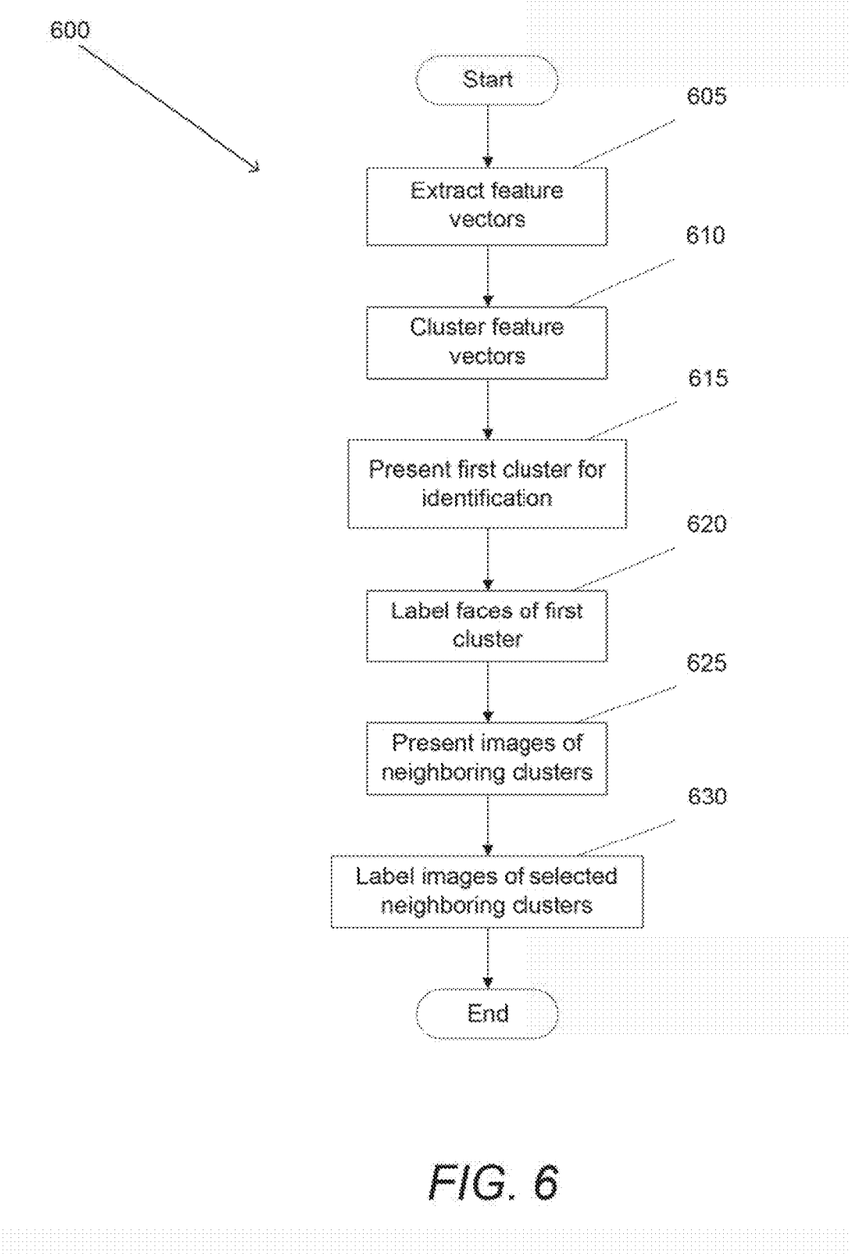
FIG. 6 is a flow chart illustrating a method for labeling elements in clusters of images.

In several embodiments, a large group of images can be quickly labeled based on an efficient and effective method for gathering label data based on neighboring clusters. A flow chart illustrating a method for labeling elements in clusters of images to minimize the amount of user interaction required to get identifications for images in accordance with an embodiment of the invention is shown in FIG. 6. In certain embodiments, the process 600 is performed via a user interface of a device associated with a user. A conceptual illustration of a user interface in accordance with an embodiment of the invention is described below with reference to FIG. 7. Process 600 extracts (605) feature vectors from the detected faces from a set of images. In some embodiments, the process optionally performs a dimensionality reduction operation, such as (but not limited to) t-distributed stochastic neighbor embedding (t-SNE), principal components analysis (PCA), and/or any other dimensionality reduction process appropriate to the requirements of a given application in order to reduce the computing power and storage required to process and analyze the feature vectors.

The process then performs (610) feature clustering to identify a set of clusters in the feature space. The clustering in accordance with a number of embodiments of the invention is over-tuned to favor precision (homogeneity), over recall (completeness). In many embodiments, clustering can be performed using a variety of clustering algorithms including (but not limited to) DBScan, mean shift clustering, label propagation, and/or other methods of clustering as appropriate to the requirements of a given application.

In some embodiments, the clustering algorithms use loss functions, such as (but not limited to) a center loss function and a triplet loss function, to penalize the neural network for having too much separation between the elements of each cluster. Processes in accordance with a number of embodiments of the invention can add a center loss function to the normal cross entropy function. The center loss function is described in greater detail in Y. Wen, K. Zhang, Z. Li, and Y. Qiao. "A discriminative feature learning approach for deep face recognition". *ECCV*. Springer, 2016, the disclosure of which, including (but not limited to) the relevant disclosure related to center loss functions that can be utilized to perform clustering, is incorporated herein in its entirety. The triplet loss function is described in F. Schroff, D. Kalenichenko, and J. Philbin. "Facenet: A unified embedding for face recognition and clustering". *Proc. CVPR*, 2015, the disclosure of which, including (but not limited to) the relevant disclosure related to the use of a triplet loss function to perform clustering, is incorporated herein in its entirety.

Clustering processes in accordance with several embodiments of the invention can be tuned for homogeneity and to minimize a distance metric (e.g., the Euclidean L2 distance) between images contained within each cluster. With larger thresholds, the clusters become larger and more complete, but are also more likely to include false positives, or images of more than one individual. In addition, faces that do not appear frequently will tend to be incorporated into other clusters when larger thresholds are applied. In many embodiments of the invention, the clustering is tuned to favor homogeneity over completeness, resulting in a larger number of smaller clusters, where each cluster is more likely to contain images of a single individual. A likely result of such clustering is also that multiple clusters are also likely to contain images of the same individual. In certain embodiments, the thresholds for the clustering process are adaptive and can change based on various properties of the process including (but not limited to) the number of images that are being processed, the distribution of the feature vectors in the feature space, and relationships between the different individuals identified in the images. The clustering process in accordance with a number of embodiments can learn the clustering thresholds based on characteristics of the individual's account. For example, in some embodiments a regression based machine learning model can evaluate the various properties of the process to predict the optimal thresholds for a clustering process.

The process then presents (at 615) faces from an initial cluster to a human annotator via a display device for identification via an input mechanism. An initial cluster in accordance with many embodiments of the invention represents faces of a single individual from a number of different images that are highly likely to be of the same person. Initial clusters can be selected based on a variety of factors including (but not limited to) a size of the cluster (e.g., a largest unlabeled cluster), a proximity to labeled clusters, and a density of the cluster. In some cases, a cluster may contain images of an individual that the user is simply not interested in, so the process in accordance with some embodiments of the invention provides an option to skip a cluster. Alternatively, or conjunctively, the process in accordance with certain embodiments of the invention presents faces from multiple clusters, where each cluster represents a different individual, in order to provide a user with options of who to label first. Once a user identifies an identity (e.g., a name, ID, etc.) to be associated with the presented face, the process labels (620) the faces associated with the feature vectors of the initial cluster with the identity.

The process then presents (625) images associated with the feature vectors of neighboring clusters. Neighboring clusters can include images of the same individual as the first cluster, but may include images in which the identity of the individual is less certain for any of a variety of reasons, including (but not limited to) when the individual is partially occluded, when the image is blurred, and/or when the image was taken in low light. The neighboring clusters may also include images where the individual had a different hairstyle or facial hair, or where the individual was a different age. The neighboring clusters to be presented can be selected based on a distance from the initial cluster. For example, in some embodiments, the neighboring clusters can be presented with the nearest neighbors (i.e., the images with the highest likelihood of being the same individual) first. In many embodiments, thresholds are utilized that are likely to identify clusters of images taken when the individual was older or younger than the images in the initial cluster. The user interface in accordance with some embodiments can solicit annotations with respect to the age of an individual where date metadata is inconsistent with a presumed age. As can readily be appreciated, any of a variety of criteria can be utilized to select clusters to present for annotation as appropriate to the requirements of a given application in accordance with various embodiments of the invention.

In many embodiments, the process selects a single representative image from each neighboring cluster because the clustering is tuned for homogeneity within the clusters. The images from within each cluster may be selected randomly, and/or based on any of several factors including (but not limited to) a distance from the center of the cluster and/or a distance from the initial cluster. For example, processes in accordance with some embodiments of the invention select a farthest element within each neighboring cluster as the representative image. In certain embodiments, the user can then select and/or deselect the images from the different clusters to indicate whether the image includes the individual identified for the initial cluster.

The process then labels (630) the images from the selected neighboring clusters with the identity associated with the initial cluster. The labeled images can then be used as a training dataset to train a classifier for identifying faces in new images and/or to retrain the feature extraction engine and/or the clustering engine to produce more compact clusters. In some embodiments, the images and the associated identities are gathered from multiple devices associated with a single user. Alternatively, or conjunctively, processes in accordance with a number of embodiments of the invention gather images and associated identities from several different users, or groups of users (e.g., users within a geographic area) to generate training data sets that are more specifically tuned for a particular group of people.

Figure 7:
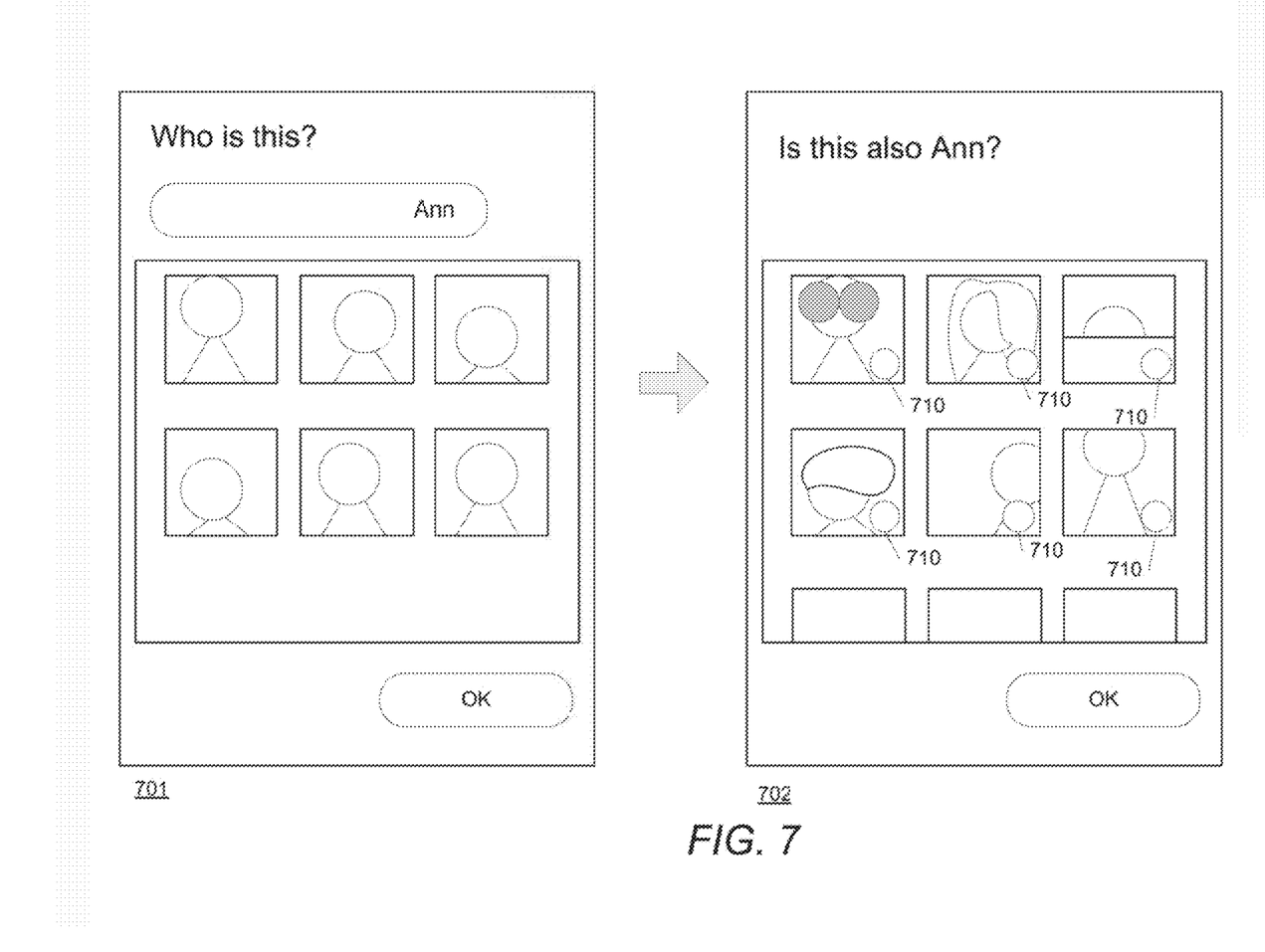
FIG. 7 illustrates an example of a user interface (UI) for labeling elements in clusters of images.

FIG. 7 illustrates an example of a user interface (UI) for labeling elements in clusters of images. In the first UI 701 of FIG. 7, the UI shows a group of images from an initial cluster of images. The initial cluster in accordance with certain embodiments is tuned to have a high probability of containing images of a single individual. In this example, each of the images, though slightly different have a relatively clear view of the individual's face, which will often result in a large and compact cluster of images of a single individual. The first stage also shows that the user has identified the face as "Ann."

After the first group of images is identified as images of "Ann", a second UI 702 displays a second set of representative images for neighboring clusters that are near the initial cluster for Ann and identified based upon satisfying at least one proximity criterion. Images from neighboring clusters can be similar to the images of the initial cluster and may share many of the identifying features of the face from the initial cluster, but are often different for various reasons including (but not limited to) occlusion of the face, aging of the face, lighting conditions of the image, pose of the subject to the camera (e.g. profile versus front facing) and/or blur.

Second UI 702 also shows selection controls 710 that allow a user to select and/or deselect images to be associated with the recommended primary identity (i.e., "Ann"). In many embodiments, a user can select from the presented images of the second UI 702 to identify the clusters that should be associated with the identity of the initial cluster. Based on the user's input, the images for the selected clusters can be labeled with the identity of the initial cluster. The unselected clusters in accordance with some embodiments can be left unlabeled or labeled with a negative label that indicates that although the identity is unknown, the images of the cluster should not be presented for at least the identity of the initial cluster.

In some embodiments, the images that are presented on the screen default to selected because there is a high confidence that these are the same identity as the initial cluster. The images in accordance with a number of embodiments are presented in a descending order of confidence in the identity to be associated with the images of each neighboring cluster. In certain embodiments, any image that is not fully displayed in the initial screen defaults to unselected to ensure that a user does not inadvertently associate images of a different individual with the identity of the initial cluster. In the example of the second UI 702, the first six images may default to selected as being "Ann," while the three images that are partially displayed at the bottom of the display area can default to unselected because they have lower confidence levels and the user has not yet viewed them completely.

Although a specific UI for labeling image clusters is described above with reference to FIG. 7, any of a variety of UIs including (but not limited to) UIs in which multiple representative images are presented for each neighboring cluster can be utilized as appropriate to the requirements of specific applications in accordance with various embodiments of the invention.

Figure 8:
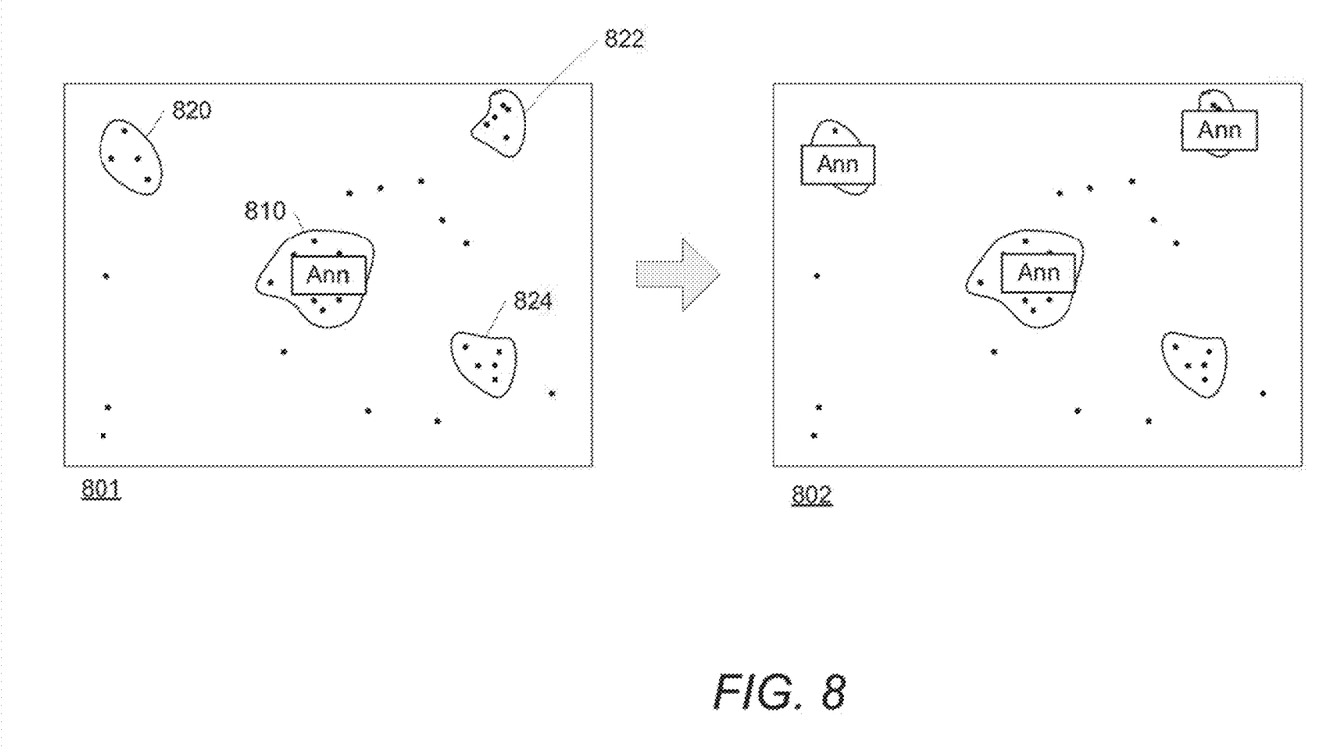
FIG. 8 illustrates an example of labeling and aggregating clusters of feature vectors.

FIG. 8 conceptually illustrates labeling and aggregating clusters of feature vectors. The first stage 801 shows an initial clustering of features. For ease of illustration, these features are shown in two-dimensions, but one skilled in the art will recognize that the feature space will often have many more dimensions, which cannot be readily represented in two dimensions. The first stage 801 shows an initial cluster 810, along with various neighboring clusters 820-824. Initial cluster 810 has been labeled with a primary identity of "Ann." In some embodiments, the labeling of the initial cluster is based on inputs received from a user (e.g., through a user interface similar to that described above with reference to user interface 701). The first stage also shows neighboring clusters 820-824, which represent feature vectors that are near the initial cluster 810, but are different enough that there is some distance between the clusters of images.

The second stage 802 shows that the initial cluster is now associated with neighboring clusters 820-822, but not 824, which is associated with a deselected image. The labeling of the neighboring clusters in accordance with several embodiments of the invention is performed through interactions with the user, such as through a user interface similar to that described above with reference to user interface 702. In such an example, each image of the second UI may be selected from the clusters 820-824 (e.g., based on distance from the initial cluster) and presented with a recommended annotation (e.g., "Is this Ann?"). The images of the selected clusters can then be labeled based on a user's selection of the different images in the UI.

In many embodiments, the labeling of neighboring clusters allows for the system to retrain the clustering CNN to allow for tighter clusters around different views of a single individual, while increasing the distance to different individuals. The tighter clusters and the increased distance provide greater confidence when classifying and labeling new images based on the retrained CNN.

Figure 9:
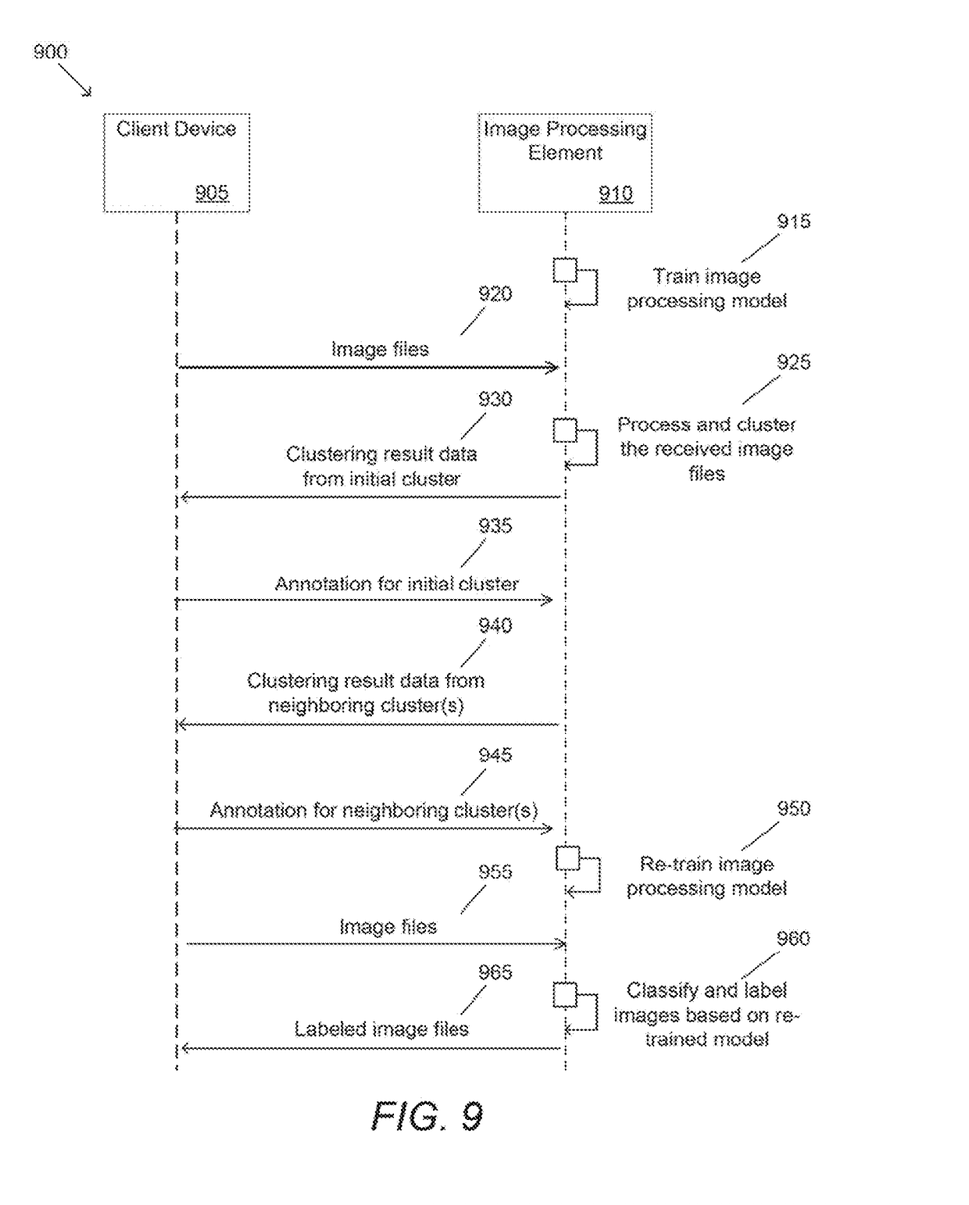
FIG. 9 is a communication diagram showing the communication of images and annotations between a client device and an image processing element, which is configured to process, cluster, and annotate images to automatically label new images.

Image processing and labeling processes can be distributed across multiple components of an image processing system. A process for image processing and labeling new images in accordance with an embodiment of the invention is illustrated in FIG. 9. In the illustrated process 900, image processing element 910 trains (915) an image processing model. Image processing models in accordance with a number of embodiments of the invention are used to perform feature extraction, clustering, and/or classification for various images. Client device 905 provides image files (920) to image processing element 910, which processes and clusters (925) the received image files. Image processing element 910 provides clustering result data 930 from an initial cluster to the client device, which presents them to a human annotator that identifies an identity of an individual within images of the clusters. Cluster result data in accordance with several embodiments of the invention can include (but is not limited to) one or more of the images of a cluster and/or image identifiers to identify images already stored at a client device. In some embodiments, image processing elements send different images from those sent by a client device, such as (but not limited to) thumbnails and cropped images. Image processing elements in accordance with several embodiments of the invention only send images when the images were originally received from a different client device. In certain embodiments, image processing elements do not send images directly, but rather identify the images and/or portions of the images to be displayed at a client device. For example, image processing elements can send an image ID along with coordinates for a bounding box, which the client device can use to present an image (or a portion of an image) on a display of the client device. Based on inputs from the annotation, the process sends an annotation 935, or identity, for the images of the initial cluster.

The image processing system 910 sends clustering result data 940 from neighboring clusters. In a number of embodiments, clustering result data from neighboring clusters includes a representative image from each of the neighboring clusters. Although shown separately in this example, one skilled in the art will recognize that the clustering result data from the initial cluster and from the neighboring clusters may be transmitted in a single batch transaction, but presented to the human annotator for annotation in multiple steps.

Client devices can then send (945) the annotation data back to an image processing element so that image processing element 910 can re-train (950) the image processing model based on the annotated images. When the client device 905 sends new image files 955 to image processing element 910 (e.g., when a user uploads new images to a photo sharing application), image processing element 910 can classify and label the new images based on the re-trained model, which has now been tuned for improved feature extraction based on images of a particular users. The image processing element 910 can then present labeled image files (965) that have been identified to show a particular individual. In some embodiments, the labeled images are presented as results of a search query or filter. Labeled images can be presented with a visual indication (such as, but not limited to, a tag and a caption) of the identities of the identified individuals.

Figure 10:
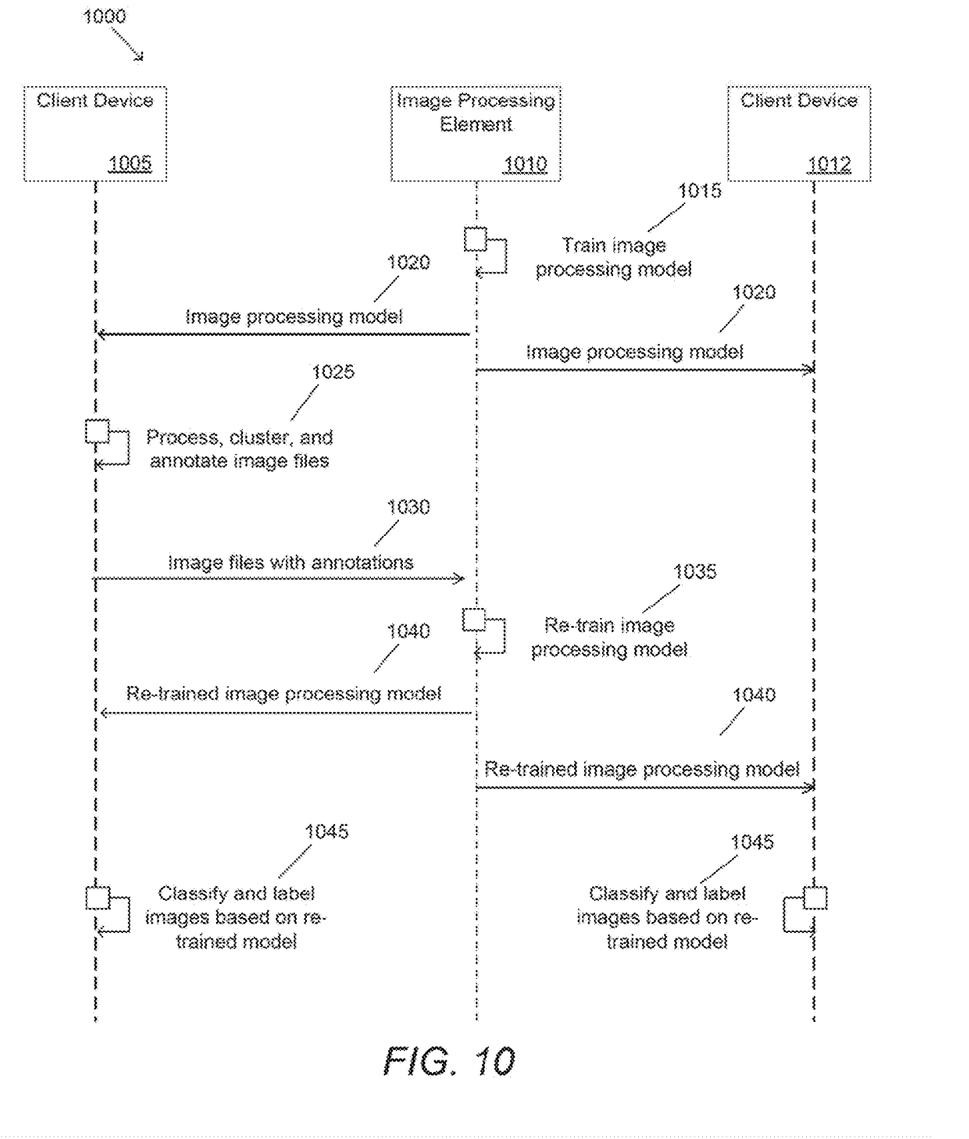
FIG. 10 is a communication diagram showing the communication of images and annotations between a set of client devices and an image processing element, which is configured to process, cluster, and annotate images to distribute a re-trained image processing model.

A process for image processing and labeling for multiple client devices in accordance with an embodiment of the invention is illustrated in FIG. 10. In the illustrated process 1000, multiple client devices 1005 and 1012 communicate with image processing element 1010. Client devices can include multiple devices associated with a particular set of users, such as (but not limited to) through a unifying user account, connected through a particular local network, and/or via associations between multiple users (e.g., friends and/or family members).

Image processing element 1010 trains (1015) an image processing model and distributes the image processing model 1020 to client devices 1005 and 1012. Client device 1005 processes images, clusters feature vectors of the images, and annotates (1025) the image files. Examples of the image processing, feature clustering, and image annotation are described above. Client device 1005 returns image files 1030 with the annotations to image processing element 1010. In some embodiments, client devices only return images that are annotated to the image processing element, rather than sending all of the images of the client device 1005. Image processing element 1005 then uses the annotated image as a part of an expanded training dataset to re-train (1050) the image processing model, which can then be distributed to the associated devices 1005 and 1012. Each of the client devices 1012 can then use the re-trained image processing model to classify and identify individuals in images at the respective device.

Although specific processes for processing, clustering, and labeling images are described above with reference to FIGS. 9 and 10, any of a variety of processes involving the communication of images, annotations, and cluster data can be utilized in accordance with embodiments of the inventions. For example, labeling of new images may be performed for new images of a client device based on images and annotations recorded at a different client device.

Further, although specific methods of image recognition are discussed above, many different recognition methods can be implemented in accordance with various different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for generating a labeled dataset using a convolutional neural net (CNN) trained with an initial dataset, the method comprising:
    extracting a set of feature vectors from a corresponding set of images based on the trained CNN;
    clustering the set of feature vectors to identify a set of clusters by setting a clustering threshold for identifying feature vectors in each cluster of the set of clusters, wherein the clustering threshold is an adaptive clustering threshold that is based on at least one of a number of images that are being processed for a particular user, a distribution of the feature vectors within a feature space, and relationships between different individuals identified in the set of images;
    presenting images of an initial cluster of the set of clusters;
    receiving an identity of an individual to be associated with the presented images;
    presenting images from each cluster of a set of neighboring clusters identified from the set of clusters; and
    based on input received from a user, associating the identity to images of the set of neighboring clusters.

2. The method of claim 1 further comprising retraining the CNN using the associated identity and the images of the initial cluster and the set of neighboring clusters.

3. The method of claim 2 further comprising:
    extracting a second set of feature vectors from a second set of images based on the retrained CNN; and
    associating the identity to a subset of the second set of images based on the second set of feature vectors.

4. The method of claim 1, wherein each feature vector of the set of feature vectors is a 128 dimensional feature vector.

5. The method of claim 1, wherein presenting images of the initial cluster comprises displaying an image for each feature vector in the initial cluster.

6. The method of claim 1, wherein the initial cluster is selected based on at least one of a size of the cluster and a compactness of the cluster.

7. The method of claim 1, wherein each neighboring cluster comprises a plurality of images, wherein presenting images from each neighboring cluster of the set of neighboring clusters comprises displaying a single image from each neighboring cluster.

8. The method of claim 7, wherein the single image from each neighboring cluster is one of a nearest image within each neighboring cluster to the initial cluster, a farthest image within each neighboring cluster to the initial cluster, and a central image within the neighboring cluster.

9. The method of claim 1, wherein presenting images from each neighboring cluster further comprises suggesting the received identity as an identity to be associated with the set of neighboring clusters.

10. The method of claim 1, wherein the input received from the user comprises a selection of a subset of the set of neighboring clusters that include images of the identified individual.

11. The method of claim 1 further comprising storing the associated identities for each image in the set of images in a database.

12. The method of claim 1 further comprising using the set of images and the associated identities as a training data set for a facial recognition CNN.

13. The method of claim 12, wherein the database stores image sets with associated identities from images received from a plurality of different devices associated with the user.

14. The method of claim 12, wherein the database stores image sets with associated identities from images of a plurality of different users.

15. A system for generating a labeled dataset using a convolutional neural net (CNN) trained with an initial dataset, the system comprising:
    one or more processors;
    memory readable by the one or more processors; and
    instructions stored in the memory that when read by the one or more processors direct the one or more processors to:
        extract a set of feature vectors from a corresponding set of images based on the trained CNN;
        cluster the set of feature vectors to identify a set of clusters by setting a clustering threshold for identifying feature vectors in each cluster of the set of clusters, wherein the clustering threshold is an adaptive clustering threshold that is based on at least one of a number of images that are being processed for a particular user, a distribution of the feature vectors within a feature space, and relationships between different individuals identified in the set of images;
        present images of an initial cluster of the set of clusters;
        receive an identity of an individual to be associated with the presented images;
        present images from each cluster of a set of neighboring clusters identified from the set of clusters; and
        based on input received from a user, associate the identity to images of the set of neighboring clusters.

16. The system of claim 15 wherein the instructions further direct the one or more processors to retrain the CNN using the associated identity and the images of the initial cluster and the set of neighboring clusters.

17. The system of claim 16, wherein the instructions further direct the one or more processors to:
    extract a second set of feature vectors from a second set of images based on the retrained CNN; and
    associate the identity to a subset of the second set of images based on the second set of feature vectors.

* * * * *